United States Patent
Sharkawi et al.

(10) Patent No.: US 10,776,185 B2
(45) Date of Patent: Sep. 15, 2020

(54) MESSAGING SOFTWARE MANAGEMENT FOR NETWORK DEVICES SUPPORTING HARDWARE TAG MATCHING

(71) Applicant: International Business Machines Corporation, Armonk, NY (US)

(72) Inventors: Sameh S. Sharkawi, Cypress, TX (US); Sameer Kumar, Mountain View, CA (US); Bryan S. Rosenburg, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/214,232

(22) Filed: Dec. 10, 2018

(65) Prior Publication Data
US 2020/0183764 A1    Jun. 11, 2020

(51) Int. Cl.
*G06F 9/54* (2006.01)
*G06F 13/10* (2006.01)

(52) U.S. Cl.
CPC .............. *G06F 9/542* (2013.01); *G06F 9/544* (2013.01); *G06F 9/546* (2013.01); *G06F 13/102* (2013.01)

(58) Field of Classification Search
CPC ...................................................... G06F 9/546
USPC ................................................ 719/313, 314
See application file for complete search history.

(56) References Cited

U.S. PATENT DOCUMENTS

| | | | |
|---|---|---|---|
| 4,424,565 | A | 1/1984 | Larson |
| 5,455,825 | A | 10/1995 | Lauer et al. |
| 5,752,076 | A | 5/1998 | Munson |
| 6,571,313 | B1 | 5/2003 | Filippi et al. |
| 7,061,929 | B1 | 6/2006 | Eberle et al. |
| 9,811,403 | B1 | 11/2017 | Sur |
| 2014/0207881 | A1 | 7/2014 | Nussle et al. |
| 2018/0219804 | A1* | 8/2018 | Graham ................... G06F 9/54 |
| 2019/0129871 | A1* | 5/2019 | Carro ................... H04L 45/745 |

OTHER PUBLICATIONS

Brian W. Barrett, Jeffrey M. Squyres, and Andrew Lumsdaine, "Implementation of Open MPI on Red Storm," Sep. 30, 2005, 9 pages.

* cited by examiner

*Primary Examiner* — Andy Ho

(74) *Attorney, Agent, or Firm* — Patterson + Sheridan, LLP

(57) ABSTRACT

Techniques are disclosed for efficient handling of messages in computing systems that include tag matching capable hardware. A message management module provides for handling message events including application receives and channel notifications such that hardware tag matching can continuously run in hardware channels, such as network adapters. When the message event is an application receive the message management module adds the application receive to a tracking queue and determines if the application receive can be posted to a hardware channel capable of tag matching. When the message event is a channel notification, the message management module determines a message action using the message tracking queue and the information in the channel notification.

20 Claims, 4 Drawing Sheets

MESSAGING SOFTWARE MANAGEMENT FOR NETWORK DEVICES SUPPORTING HARDWARE TAG MATCHING

BACKGROUND

The present invention relates to tag matching for messages in computing nodes that include hardware capable of performing tag matching, and more specifically, to enabling more efficient and continuous tag matching in hardware.

High-performance computing (HPC) systems utilize parallel processing for running advanced application programs efficiently, reliably and quickly. To meet the needs of scientific research and engineering simulations, HPC systems are growing in size and scale and are connected by networks. Current network adapters for the HPC computing nodes (e.g., InfiniBand (IB) adapters) support hardware matching of tags in incoming messages.

However, even with hardware matching there are typical restrictions in network adapter technologies. For example, the network adapters may not efficiently manage wild card messages and unexpected messages that could be received from any given source on a computing node, resulting in disabled hardware tag matching. This results in less efficient processing of messages at the computing node, even while the hardware tag matching is meant to improve the processing.

SUMMARY

According to one embodiment of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for message management. The method including receiving, at a message management module, a first message event and a second message event; determining a first event type for the first message event where the first event type includes an application receive; adding, based on determining the first event type, the application receive to a message tracking queue; determining, based on determining the first event type, that a blocking status of the message tracking queue is not blocked; and determining, based on determining the blocking status and based on a source specifier of the application receive, one or more arriving channels from a plurality of arriving channels including at least one or more hardware channels; determining a second event type for the second message event where the second event type includes a channel notification; and executing, based on determining the second event type, a message action determined based on the message tracking queue and the channel notification. Other embodiments of this aspect include corresponding computer systems, apparatus, and computer programs recorded on one or more computer storage devices, each configured to perform the actions of the methods.

Another embodiment presented in this disclosure is a system including one or more computer processors, and a memory containing a program which when executed by the processors performs an operation. The operation includes receiving, at a message management module, a first message event and a second message event; determining a first event type for the first message event where the first event type includes an application receive; adding, based on determining the first event type, the application receive to a message tracking queue; determining, based on determining the first event type, that a blocking status of the message tracking queue is not blocked; and determining, based on determining the blocking status and based on a source specifier of the application receive, one or more arriving channels from a plurality of arriving channels including at least one or more hardware channels; determining a second event type for the second message event where the second event type includes a channel notification; and executing, based on determining the second event type, a message action determined based on the message tracking queue and the channel notification.

Another embodiment presented in this disclosure is a computer program product including a computer-readable storage medium having computer-readable program code embodied therewith, the computer-readable program code executable by one or more computer processors to perform an operation. The operation includes receiving, at a message management module, a first message event and a second message event; determining a first event type for the first message event where the first event type includes an application receive; adding, based on determining the first event type, the application receive to a message tracking queue; determining, based on determining the first event type, that a blocking status of the message tracking queue is not blocked; and determining, based on determining the blocking status and based on a source specifier of the application receive, one or more arriving channels from a plurality of arriving channels including at least one or more hardware channels; determining a second event type for the second message event where the second event type includes a channel notification; and executing, based on determining the second event type, a message action determined based on the message tracking queue and the channel notification.

DETAILED DESCRIPTION

HPC systems utilize parallel processing on multiple computing nodes to execute advanced application programs that require large amounts of processing power. As the size and complexity of the HPC systems increase, the efficient handling of messages between each component of the system becomes more important to avoid overburdening both hardware and software processes in the components of the multiple computing nodes. The embodiments described herein provide for constant use of hardware tag matching and for tag matching to non-hardware channels in a message management module. Thus each component in the message handling system, such as hardware channels (e.g., network adapters) and non-hardware channels can efficiently handle and process the messages and message events transmitted between the nodes of the HPC systems.

Figure 1:
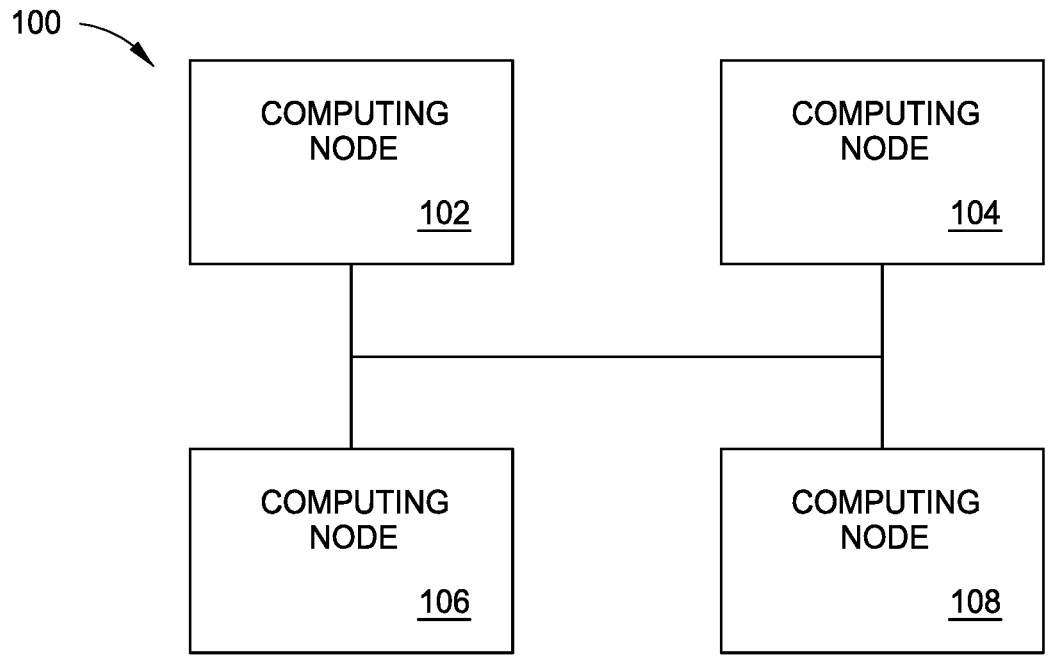
FIG. 1 depicts a high performance computing system, according to one embodiment described herein.

As shown in FIG. 1, which depicts a HPC system 100, the HPC systems utilize distinct and independent computing nodes together to provide the necessary processing power to the application running on the HPC systems. As the size of these systems grow and the processing needs of the applications executing on the HPC systems increase, it is important that messages passing between the applications running on the individual computing nodes, such as computing nodes 102, 104, 106, and 108 in HPC system 100, be processed quickly and efficiently. Ensuring the messaging interfaces stay as streamlined as possible, results in less processing resources of the computing nodes 102-108 being dedicated to message passing.

In some examples, the network adapters (e.g., IB adapters) support hardware matching of tags in incoming messages received at the hardware of the network adapter. Hardware tag matching enables faster processing of both short and long messages in an Message Passing Interface (MPI) programming paradigm. While, in standard MPI message processing, a processor of a computing node explicitly issues a remote direct memory access (RDMA) read after the message is matched to a target buffer; hardware tag matching in the network adapter enables asynchronous payload transfer, which enables data at one computing node to move to the target computing node via RDMA reads, without burdening the processors of the computing node. However, in order for the hardware tag matching to function efficiently, the tag matching done at the hardware level needs to be accomplished for as many messages as possible.

As the HPC systems grow and each node within the system has network adapters, the number of messages that cannot be handled at the hardware level grows. For example, network adapters cannot perform tag matching when an application receive from an application specifies a wild-carded source (e.g., an unspecified source) In this example, hardware tag-matching must be disabled when the application receive is queued and disabled for that application receive and all subsequent application receives until the wild-carded application receive is matched with an incoming message. As described herein, the hardware tag matching is re-enabled upon receiving a wild-card or blocking application receive to ensure that subsequent matches can be made in the hardware adapters/channels.

In addition, hardware adapters may require software to handle scenarios where message headers arrive on the target node before a receive for the message has been posted (e.g., unexpected messages). Message matching may also have to be enabled for a subclass of traffic such as remote nodes. Additionally local messages within the node may still have to go over shared memory during message passing. All of these exceptions require the computing nodes to do additional processing of the messages when the tag matching fails at the hardware level. As described herein, a message management module is provided in order to efficiently handle application receives and channel message event notifications to ensure the hardware adapters continue to perform hardware tag matching.

Figure 2:
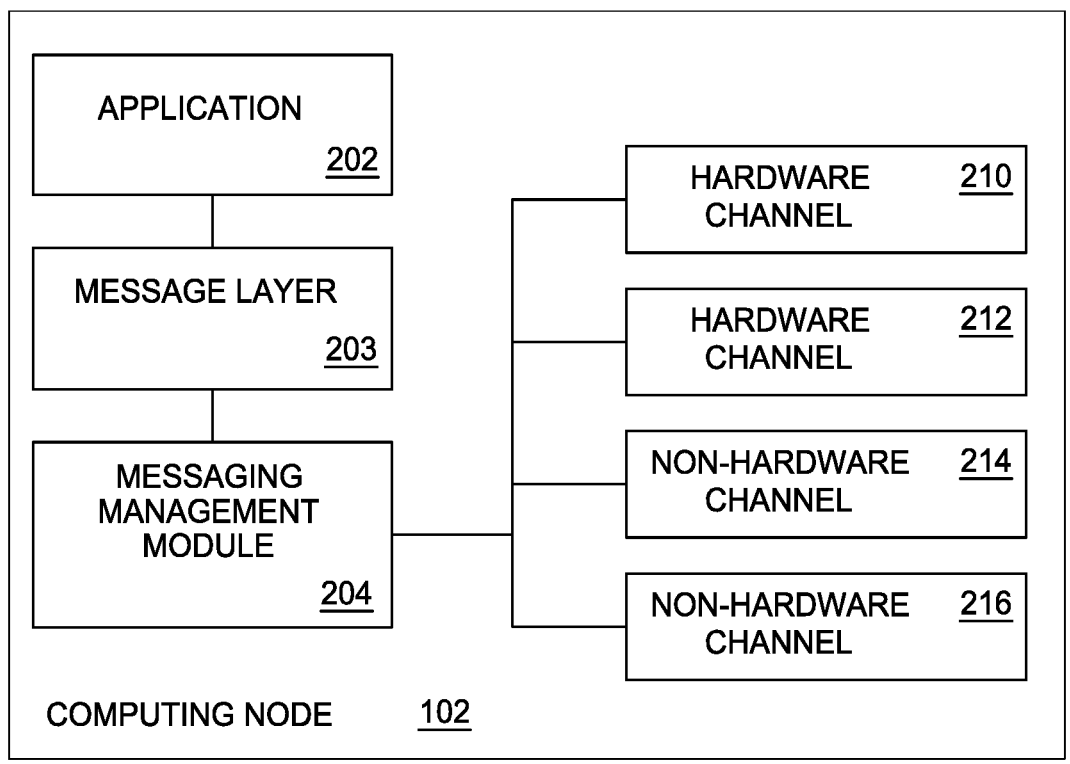
FIG. 2 depicts a computing node in a high performance computing system, according to one embodiment described herein.

FIG. 2 depicts a computing node in a high performance computing system with a messaging management module. The messaging management module described allows for more efficient handling of message events so that tag matching in the message channels can be executed more efficiently and continuously. As shown, the computing node 102 includes the messaging management module 204, an application 202, an upper message layer 203, and various message channels 210-216. The message channels are arriving channels for the use of the messaging management module 204 and include hardware channels 210 and 212 (e.g.; one or more network adapters). The message channels also include the non-hardware channels 214 and 216 (e.g., software-supported communication paths, such as shared memory, pipes, sockets, etc.).

Figure 3:
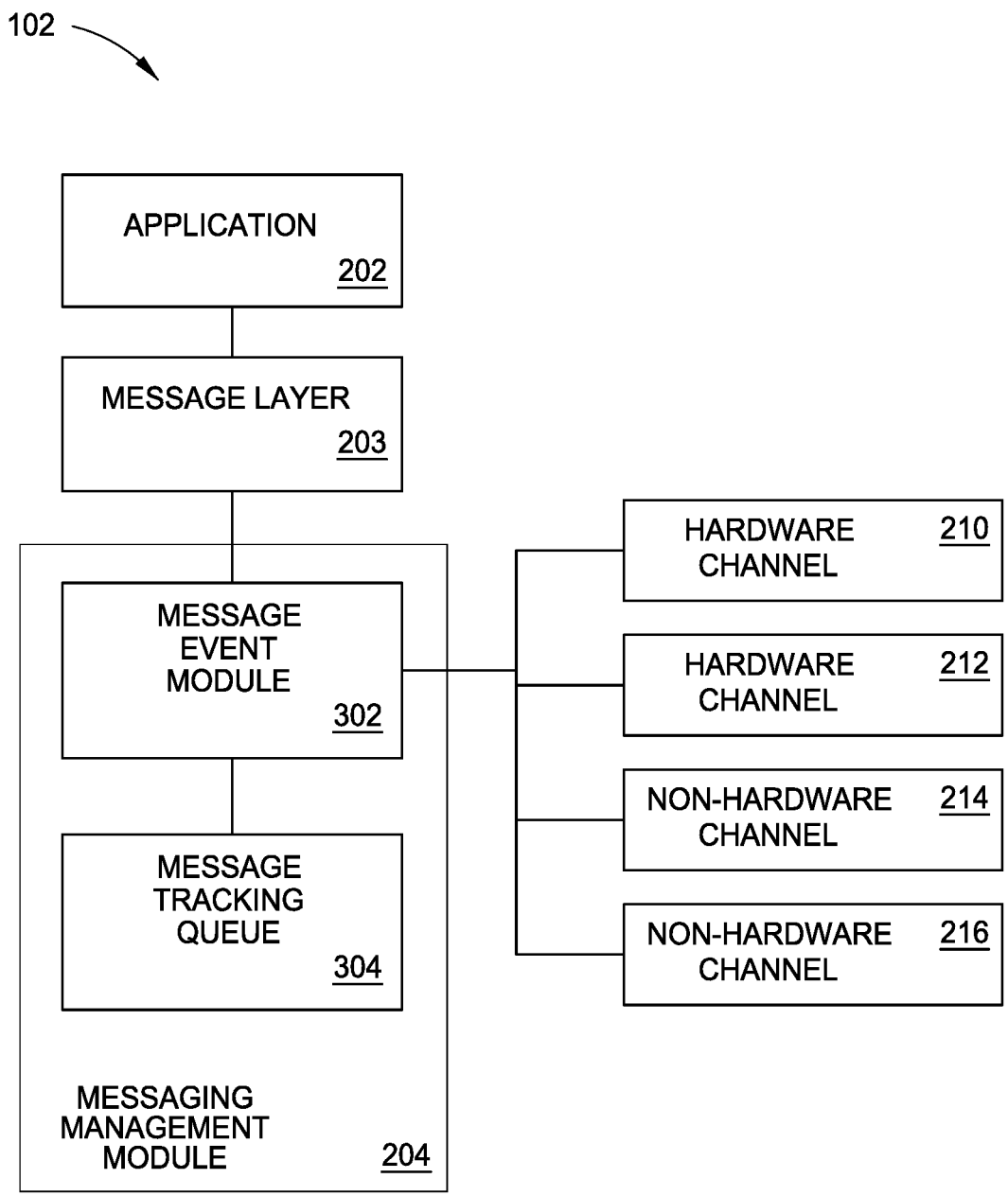
FIG. 3 depicts a messaging management module, according to one embodiment described herein.

FIG. 3 is a messaging management module within the computing node in the high performance computing system, according to one embodiment described herein. The messaging management module 204 includes a message event module 302 and a message tracking queue 304. While described herein as a single queue, the message tracking queue 304 may maintain separate queues for message posted/added to a hardware channel, blocking messages, messages posted to non-hardware channels, etc. As shown, the message event module 302 also communicates with the message layer 203, which is a higher level messaging layer such as OpenMPI PML (portable message layer) and with the application 202, through the message layer 203. The message event module 302 generally receives message events, and the message event module 302 determines how to handle the message event. In some cases, such as when the message event is a non-blocking application receive destined for a hardware channel, the message event module 302 will post the message event (application receive) to an appropriate message hardware channel. While the expected message event is posted to a message channel, the message event module also keeps track of the application receives in the message tracking queue 304.

Figure 4:
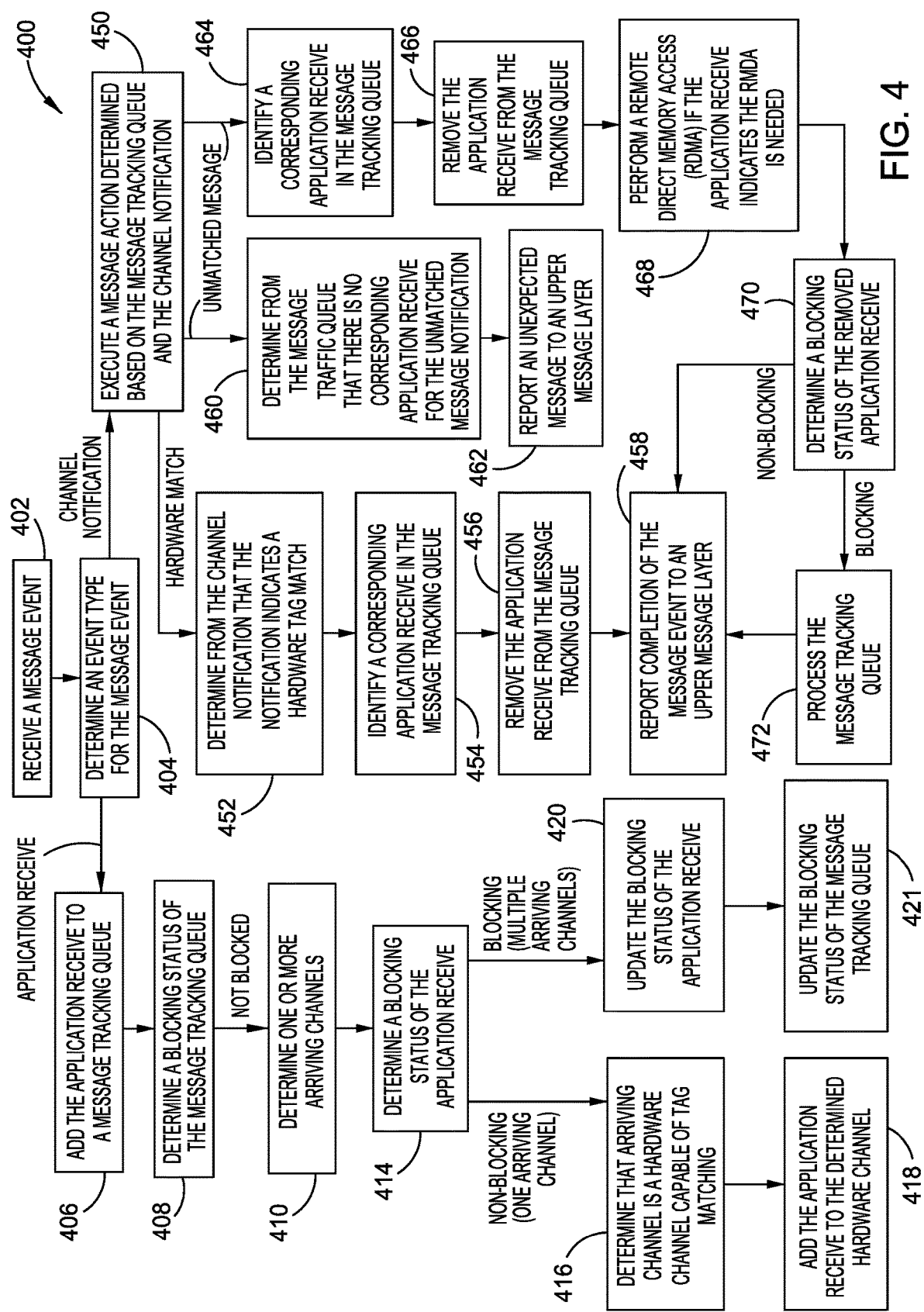
FIG. 4 illustrates a method for message management, according to one embodiment described herein.
Figure 5:
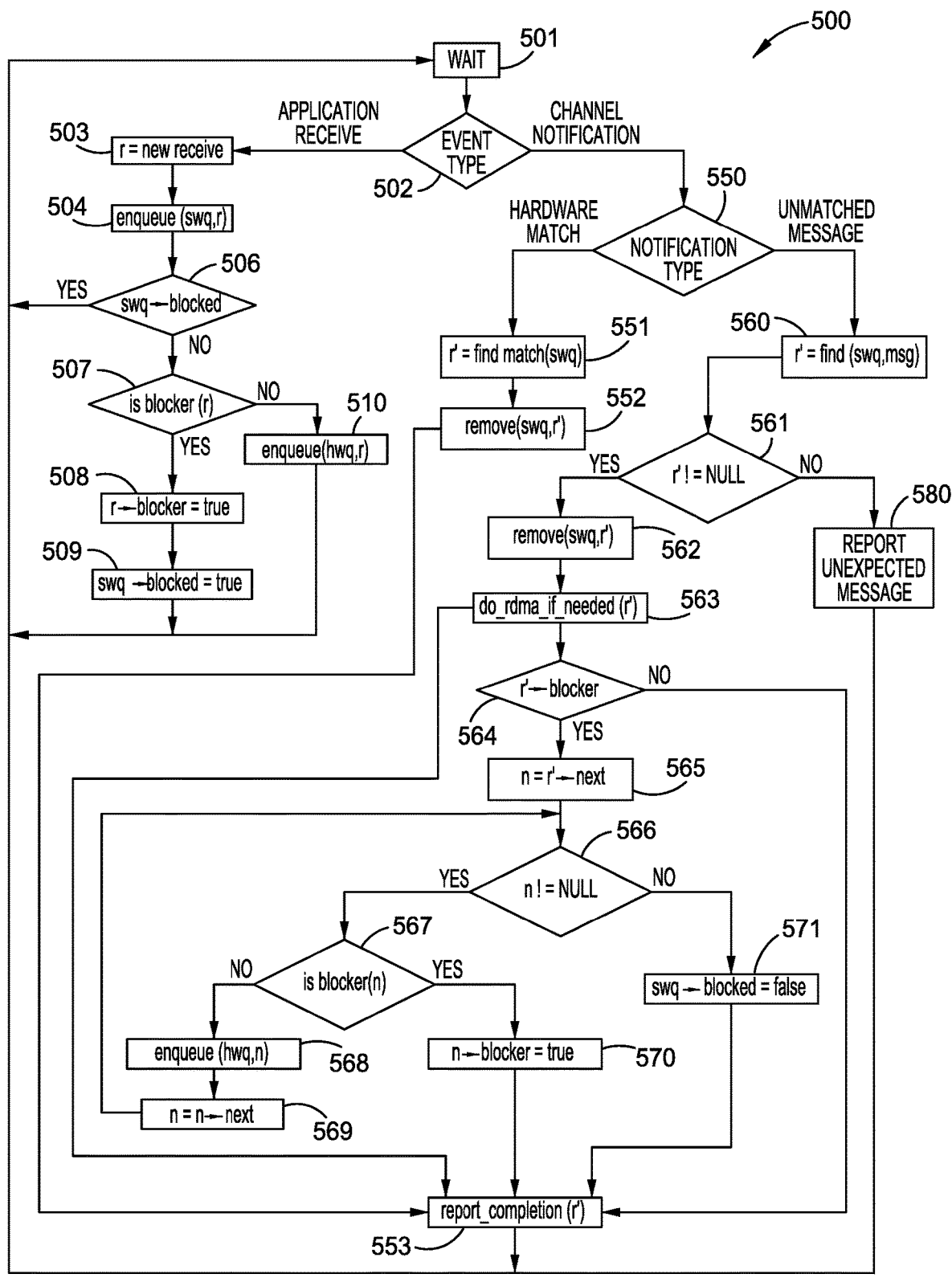
FIG. 5 illustrates a system flow diagram for message management, according to one embodiment described herein.

FIG. 4 illustrates a method for message management, according to one embodiment described herein. Method 400 will be described in relation to FIG. 5, which illustrates a system flow diagram for message management, performed by the messaging management module 204. As shown in FIG. 4, method 400 begins at block 402 where messaging management module 204, including the message event module 302, receives one or more message events. As shown in FIG. 5, at block 501, the message event module 302 is generally waiting to process message events received from both the application 202, through the message layer 203, and from hardware channels 210 and 212 and non-hardware channels 214 and 216. The message management module 204 handling the message events allows for the hardware tag matching to continuously occur on the hardware channels (e.g., not be blocked by a wild-card message).

At block 404, the message event module 302 determines an event type for the message event, as shown at block 502. In some examples, the event type includes either an application receive or a channel notification. For example, an application receive may be received from the application 202 via the message layer 203. The application receive indicates that the application is expecting a message from another computing node from a message channel (e.g., arriving channel). In another example, the hardware channels and non-hardware channels may send a channel notification to the message event module. For example, the non-hardware channel 214 may transmit an unmatched message channel notification, indicating a message has been received on the non-hardware channel. The hardware channels 212 and 214 may transmit an unmatched message notification similar to the non-hardware channels and/or also transmit a hardware notification indicating the hardware has performed a tag match for an application receive added to the hardware channel.

When the event type is an application receive, the method 400 proceeds to block 406, where the message event module 302 adds the application receive to a message tracking queue such as message tracking queue 304. As shown at block 503, the application receive is assigned an identifier "r" and added (enqueued) in the message tracking queue 304 (software queue ("swq")). At block 408, the message management module determines a blocking status of the message tracking queue. For example, if the message tracking queue 304 is marked as blocked, such as the "yes" decision from block 506, the application receive cannot be added to a hardware or other channel due the blocked message queue. The message event module 302 then returns to the waiting stage (e.g., "yes" from the block 506) at block 501.

When the message event module 302 determines the blocking status of the message tracking queue 304 is not blocked, method 400 continues at block 410, where the method includes determining, based on a source specifier of the application receive, one or more arriving channels from a plurality of arriving channels comprising at least one or more hardware channels. The arriving channels include one or more hardware channels such as hardware channel 210 and 212, and one or more non-hardware channels such as non-hardware channels 214 and 216. The arriving channel is the channel on which a corresponding message for the application receive should be received. In some examples, there may be multiple channels on which the corresponding message may be received. At block 414, the message event module 302 determines a blocking status of the application receive, such as shown at block 507 in FIG. 5. The application receive is a blocking application receive when there are multiple channels on which a corresponding message may be received, since the application receive cannot be posted to any one channel. The application receive is a non-blocking application receive when there is one channel on which a corresponding message may be received, since the application receive can be posted to the one channel. When the application receive is a non-blocking application receive, the method 400 continues at block 416 where the message event module 302 determines that the arriving channel is a hardware channel capable of tag matching.

For example, the message event module 302 determines that hardware channel 210 is the arriving channel. In this example, a message corresponding to the application receive is expected to be received on the hardware channel 210 from another source, such as another computing node described in FIG. 1.

At block 418, the message event module 302 posts and/or enqueues the application receive to the determined hardware channel. For example, as shown in block 510, the application receive is added/enqueued to the hardware channel 210, where the hardware channel 210 can perform tag matching using the added application receive and a received message, once the incoming message is received at the hardware channel 210. In another example, the message event module 302 determines that one of the non-hardware channels 214 or 216 is the arriving channel. If the non-hardware channels are able to perform tag matching the non-hardware channels can be selected as the arriving channel and the message is added/enqueued to the non-hardware channel. In an example where the hardware and/or non-hardware channel is not capable of tag matching on the channel, the application receive will not be posted to the arriving channel, and the message event module 302 will perform the tag matching as described herein. Once the message is added to the determined tag matching capable hardware channel and/or the application receive arriving channel is determined to not be capable of tag matching, the message event module 302 returns to the wait state at block 501.

Returning back to block 414 in FIG. 4 and block 507 in FIG. 5, if the blocking status of the application receive is determined to be a blocking application receive, that is there are multiple channels on which a corresponding message may be received, the application receive in the message tracking queue 304 is updated to reflect that it is a blocking application receive. For example, at block 420, the message event module updating the blocking status of the application receive to a blocking application receive in the message tracking queue 304. At block 421, the message event module 302 updates the blocking status of the message tracking queue to a blocking status. For example, as shown in blocks 508 and 509 of FIG. 5, the application receive "r" is marked as a blocking application receive and the message tracking queue 304 "swq" is also marked as a blocked software queue. Blocking the message tracking queue 304 instead of the adding the blocking application receive to a hardware channel allows for the hardware channels to continue to perform hardware tag matching, while the messaging management module 204 handles the blocking application receives. When the message tracking queue is blocked, no application receives can be posted to hardware until the blocking application receive is resolved, as described herein; however, the hardware tag matching is not blocked on the hardware channels for application receives already added to the hardware channels. Once the message tracking queue 304 is marked as blocked, the message event module 302 returns to the waiting stage at block 501.

Returning back to block 404, where the message event module 302 determines an event type for the message event, as shown at block 502. When the event type is a channel notification, method 400 continues at block 450 where the message event module 302 executes a message action determined based on the message tracking queue and the channel notification. For example, when the channel notification is a hardware match, method 400 proceeds to block 452, where the message event module 302 determines from the channel notification that the notification indicates a hardware tag match. For example, when the hardware channel 210 matches an application receive added to its queue with an incoming message, it indicates the match has been made in the hardware to the message event module 302 with the channel notification including the hardware match notification.

At block 454, the message event module 302 identifies a corresponding application receive in the message tracking queue. For example, the application receive "r" added to the hardware channel 210 at block 510 is also tracked in the "swq" message tracking queue 304. As shown at block 551, the message event module identifies and/or finds the matching application receive "r" for the channel notification "r'" in the message tracking queue 304. At block 456 (block 552 in FIG. 5), the message event module 302 then removes the application receive "r" from the message tracking queue 304 and reports completion of the message event to an upper message layer, such as the message layer 203, at block 458 (block 553 in FIG. 5). The hardware tag matching and removal of the corresponding application receive from the message tracking queue 304 can occur even when the message tracking queue 304 is blocked.

Returning back to block 450, when the channel notification comprises an unmatched message notification received from one or more message channels (including hardware and non-hardware message channels), the method 400 continues to either block 460 or block 464. In some examples, such as at block 560 and 561 of FIG. 5, the message event module 302 attempts to match an application receive in the message tracking queue 304. In some examples, the unmatched message "r'" does not have a corresponding application receive in the message tracking queue 304 and the method 400 continues to block 460, where the message event module determines from the message tracking queue 304 that there is no corresponding application receive (e.g., no matching "r") for the unmatched message notification "r'" in the message tracking queue. At block 462 (block 580 in FIG. 5), the message event module 302, reports an unexpected message to an upper message layer, such as message layer 203. The message layer will then process the unexpected message. Once the unexpected message is reported to the message layer 203, the message event module 302 returns to the waiting status at block 501 in FIG. 5.

In some examples, the unmatched message "r'" will have a corresponding application receive in the message tracking queue 304. For example, the unmatched message may correspond to a blocking application receive in the message tracking queue 304, or to an application receive that has only been added to a blocked software queue (message tracking queue 304). The method 400 continues to block 464, where the message event module identifies a corresponding application receive ("r") in the message tracking queue for the unmatched message "r'" and removes the application receive from the message tracking queue at block 466. For example, as shown in FIG. 5, when the message event module 302 determines there is a match at block 561, the message event module 302 removes the matched message "r'" from the "swq" message tracking queue 304.

At block 468, the message event module 302 performs an asynchronous payload transfer via a RDMA if the application receive indicates the RDMA is needed. For example, is the application receive and the channel notification indicate a hardware channel needs to perform an RDMA, the message event module 302 notifies a hardware channel of the needed RDMA. In some examples, once the RDMA is completed the hardware channel returns a channel notification indicating the RDMA is completed to the message management module, which indicates the RDMA is completed to the message layer 203.

After an RDMA is reported to the hardware, if needed, method 400 proceeds to block 470, where the message event module 302 determines a blocking status of the removed application receive. For example, if the application receive "r" corresponding to the channel notification "r'" is a blocking application receive, further processing of the message tracking queue 304 will be needed to add messages to the hardware channels, unblock the message tracking queue 304, and/or leave the message tracking queue 304 blocked. When the application receive "r" is not a blocking application receive, method 400 proceeds to block 458, where the message event module 302 reports completion of the message event to an upper message layer, such as message layer 203. Once the message event is reported as completed the message event module 302 returns to a waiting state at block 501.

When the application receive "r" is not a blocking application receive, method 400 proceeds to block 472, where the message event module 302 processes the message tracking queue until a next application receive in the message tracking queue is another blocking application receive or the message tracking queue is empty. For example, as shown in FIG. 5, at blocks 565-570, the message event module 302 begins proceeding through the application queue by selecting the next application receive "n" in the message tracking queue 304 after from the removed "r" application receive. As long as there are application receives that can be posted to the hardware channels in the message tracking queue 304 the message event module 302 processes the message tracking queue 304. For example, at block 567, the message event module 302 determines if the current "n" application receive is a blocking application receive. If "n" is a blocking application receive (yes) the message event module 302 marks the "n" application receive as a blocker, and leaves the "swq" as blocked. In another example, when "n" is not a blocking application receiver (no) the message event module 302 determines and selects a message channel for the "n" application receive and at block 568 adds it to the selected channel (e.g., adding to a hardware channel and/or leaving the application receive the message tracking queue for non-hardware channels, etc.). The message event module 302 at block 569 selects the next application receive in the message tracking queue 304 and repeats the steps of blocks 566-569.

Once the message tracking queue 304 is fully processed such that there is no next application receive in the application queue, the message event module 302, at block 571, sets the message application queue 304 as unblocked, and at block 553 (block 458) reports completion of the message event to the message layer 203.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As described above, including in relation to FIGS. 2 and 3, various computing components may be included to perform the methods described herein. For example, computing node 102 may include one or more of any of several types of bus structures, including a memory bus or memory controller, a peripheral bus, an accelerated graphics port, and a processor or local bus using any of a variety of bus architectures connecting the various components of computing node 102. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, computing node 102 typically includes a variety of computer system readable media. Such media may be any available media that is accessible by computing node 102, and it includes both volatile and non-volatile media, removable and non-removable media.

Computing node 102 can also include computer system readable media in the form of volatile memory, such as random access memory (RAM) and/or cache memory. Computing node 102 may further include other removable/non-removable, volatile/non-volatile computer system storage media. In some examples, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to a bus by one or more data media interfaces.

Additionally, the computing node 102 may include at least one program product having a set (e.g., at least one) of program modules that are configured to carry out the functions of embodiments of the invention. Computing node 102 may further include other removable/non-removable volatile/non-volatile computer system storage media. In some examples, the storage system may be included as part of memory and may typically provide a non-volatile memory for the networked computing devices, and may include one or more different storage elements such as Flash memory, a hard disk drive, a solid state drive, an optical storage device, and/or a magnetic storage device.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

The invention claimed is:

1. A method for message management comprising:
   receiving, at a message management module, a first message event;
   determining a first event type for the first message event wherein the first event type comprises an application receive;
   adding, based on determining the first event type, the application receive to a message tracking queue;
   determining, based on determining the first event type, that a blocking status of the message tracking queue is not blocked; and
   determining, based on determining the blocking status and based on a source specifier of the application receive, one or more arriving channels from a plurality of arriving channels comprising at least one or more hardware channels.

2. The method of claim 1, wherein determining, the one or more arriving channels further comprises:
   when the blocking status of the application receive is a non-blocking application receive, wherein a non-blocking application receive has one determined arriving channel:
      determining that the arriving channel is a hardware channel of the one or more hardware channels using the source specifier, wherein the arriving channel is capable of tag matching; and
      posting the application receive to the determined hardware channel; and
   when the blocking status of the application receive is a blocking application receive, wherein the blocking application receive has more than one determined arriving channel:
      updating the blocking status of the message tracking queue to a blocking status; and
      updating the blocking status of the application receive to a blocking application receive in the message tracking queue.

3. The method of claim 1, further comprising:
   receiving, at the message management module, a second message event;
   determining a second event type for the second message event wherein the second event type comprises a channel notification; and
   executing, based on determining the second event type, a message action determined based on the message tracking queue and the channel notification, wherein when the channel notification comprises a hardware notification received from the one or more hardware channels, executing the message action comprises:
      determining from the channel notification that the notification indicates a hardware tag match;
      identifying a corresponding application receive in the message tracking queue;
      removing the application receive from the message tracking queue; and
      reporting completion of the second message event to an upper message layer.

4. The method of claim 3, wherein when the channel notification comprises an unmatched message notification received from one or more message channels, executing the message action comprises:
   determining from the message tracking queue that there is no corresponding application receive for the unmatched message notification in the message tracking queue; and
   reporting an unexpected message to an upper message layer.

5. The method of claim 3, wherein when the channel notification comprises an unmatched message notification received from one or more message channels, executing the message action comprises:
   identifying a corresponding application receive in the message tracking queue;

removing the application receive from the message tracking queue; and performing a remote direct memory access (RDMA) if the application receive indicates the RDMA is needed.

6. The method of claim 5, further comprising:

determining a blocking status of the removed application receive; and when the blocking status of the removed application receive is a non-blocking application receive:

reporting completion of the second message event to an upper message layer.

7. The method of claim 6, wherein the blocking status of the application receive is a blocking application receive, the method further comprising:

processing the message tracking queue until a next application receive in the message tracking queue is another blocking application receive or the message tracking queue is empty; and reporting completion of the second message event to an upper message layer.

8. A system comprising:

one or more computer processors; and a memory containing a program which when executed by the processors performs an operation comprising:

receiving, at a message management module, a first message event;

determining a first event type for the first message event wherein the first event type comprises an application receive;

adding, based on determining the first event type, the application receive to a message tracking queue;

determining, based on determining the first event type, that a blocking status of the message tracking queue is not blocked; and determining, based on determining the blocking status and based on a source specifer of the application receive, one or more arriving channels from a plurality of arriving channels comprising at least one or more hardware channels.

9. The system of claim 8, wherein determining, the one or more arriving channels further comprises:

when the blocking status of the application receive is a non-blocking application receive, wherein a non-blocking application receive has one determined arriving channel:

determining that the arriving channel is a hardware channel of the one or more hardware channels using the source specifier, wherein the arriving channel is capable of tag matching; and posting the application receive to the determined hardware channel; and when the blocking status of the application receive is a blocking application receive, wherein the blocking application receive has more than one determined arriving channel:

updating the blocking status of the message tracking queue to a blocking status; and updating the blocking status of the application receive to a blocking application receive in the message tracking queue.

10. The system of claim 8, wherein the operation further comprises:

receiving, at the message management module, a second message event;

determining a second event type for the second message event wherein the second event type comprises a channel notification; and executing, based on determining the second event type, a message action determined based on the message tracking queue and the channel notification, wherein when the channel notification comprises a hardware notification received from the one or more hardware channels, executing the message action comprises:

determining from the channel notification that the notification indicates a hardware tag match;

identifying a corresponding application receive in the message tracking queue;

removing the application receive from the message tracking queue; and reporting completion of the second message event to an upper message layer.

11. The system of claim 10, wherein when the channel notification comprises an unmatched message notification received from one or more message channels, executing the message action comprises:

determining from the message tracking queue that there is no corresponding application receive for the unmatched message notification in the message tracking queue; and reporting an unexpected message to an upper message layer.

12. The system of claim 10, wherein when the channel notification comprises an unmatched message notification received from one or more message channels executing the message action comprises:

identifying a corresponding application receive in the message tracking queue;

removing the application receive from the message tracking queue; and performing a remote direct memory access (RDMA) if the application receive indicates the RDMA is needed.

13. The system of claim 12, wherein the operation further comprises:

determining a blocking status of the removed application receive; and when the blocking status of the removed application receive is a non-blocking application receive:

reporting completion of the second message event to an upper message layer.

14. The system of claim 13, wherein the blocking status of the application receive is a blocking application receive, the operation further comprising:

processing the message tracking queue until a next application receive in the message tracking queue is another blocking application receive or the message tracking queue is empty; and reporting completion of the second message event to an upper message layer.

15. A computer program product comprising:

a computer-readable storage medium having computer-readable program code embodied therewith, the computer-readable program code executable by one or more computer processors to perform an operation, the operation comprising:

receiving, at a message management module, a first message event and a second message event;

determining a first event type for the first message event wherein the first event type comprises an application receive;

adding, based on determining the first event type, the application receive to a message tracking queue;

determining, based on determining the first event type, that a blocking status of the message tracking queue is not blocked; and determining, based on determining the blocking status and based on a source specifier of the application receive, one or more arriving channels from a plurality of arriving channels comprising at least one or more hardware channels.

16. The computer program product of claim 15, wherein determining, the one or more arriving channels further comprises:
   when the blocking status of the application receive is a non-blocking application receive, wherein a non-blocking application receive has one determined arriving channel:
      determining that the arriving channel is a hardware channel of the one or more hardware channels using the source specifier, wherein the arriving channel is capable of tag matching; and
      posting the application receive to the determined hardware channel; and
   when the blocking status of the application receive is a blocking application receive, wherein the blocking application receive has more than one determined arriving channel:
      updating the blocking status of the message tracking queue to a blocking status; and
      updating the blocking status of the application receive to a blocking application receive in the message tracking queue.

17. The computer program product of claim 15, wherein the operation further comprises:
   receiving, at the message management module, a second message event;
   determining a second event type for the second message event wherein the second event type comprises a channel notification; and
   executing, based on determining the second event type, a message action determined based on the message tracking queue and the channel notification, wherein when the channel notification comprises a hardware notification received from the one or more hardware channels, executing the message action comprises:
      determining from the channel notification that the notification indicates a hardware tag match;
      identifying a corresponding application receive in the message tracking queue;
      removing the application receive from the message tracking queue; and
      reporting completion of the second message event to an upper message layer.

18. The computer program product of claim 17, wherein the channel notification comprises an unmatched message notification received from one or more message channels, and wherein executing the message action comprises:
   determining from the message tracking queue that there is no corresponding application receive for the unmatched message notification in the message tracking queue; and
   reporting an unexpected message to an upper message layer.

19. The computer program product of claim 17, wherein when the channel notification comprises an unmatched message notification received from one or more message channels, executing the message action comprises:
   identifying a corresponding application receive in the message tracking queue;
   removing the application receive from the message tracking queue; and
   performing a remote direct memory access (RDMA) if the application receive indicates the RDMA is needed.

20. The computer program product of claim 19, wherein the operation further comprises:
   determining a blocking status of the removed application receive; and
   when the blocking status of the removed application receive is a non-blocking application receive:
      reporting completion of the second message event to an upper message layer; and
   when the blocking status of the application receive is a blocking application receive:
      processing the message tracking queue until a next application receive in the message tracking queue is another blocking application receive or the message tracking queue is empty; and
      reporting completion of the second message event to an upper message layer.

* * * * *